Feb. 24, 1931.  I. P. WHITEHOUSE  1,793,888

DRIVING CONNECTION

Original Filed July 22, 1927

INVENTOR.
Irving P. Whitehouse
BY
ATTORNEYS.

Patented Feb. 24, 1931

1,793,888

UNITED STATES PATENT OFFICE

IRVING P. WHITEHOUSE, OF ERIE, PENNSYLVANIA, ASSIGNOR TO HUGH C. LORD, OF ERIE, PENNSYLVANIA

DRIVING CONNECTION

Application filed July 22, 1927, Serial No. 207,708. Renewed September 6, 1929.

The present invention is designed to provide a flexible driving joint. In carrying out the invention, I utilize rubber joint elements having an outer member, an inner member within the outer member and an interposed portion of rubber surface-bonded to the outer and inner members and of such length relatively to its diameter as to permit of a movement of the inner member out of axial alinement with the outer member.

The invention is illustrated in the accompanying drawings as follows:—

Figure 1:
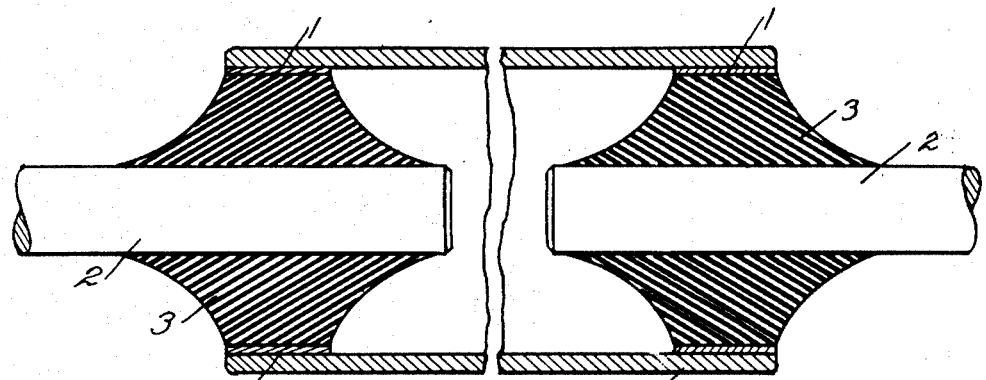

Fig. 1 shows a double connection with the inner members in alinement.

Figure 2:
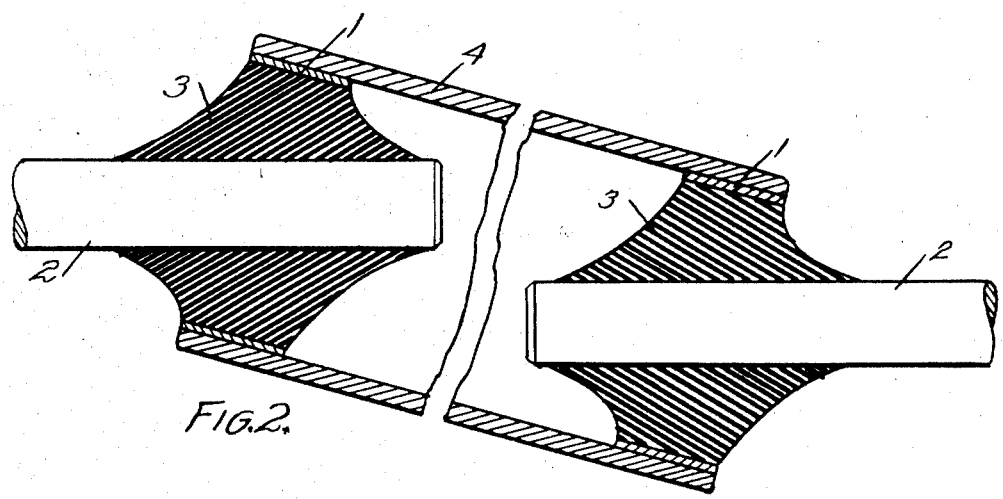

Fig. 2 a similar view with these members out of alinement.

Figure 3:
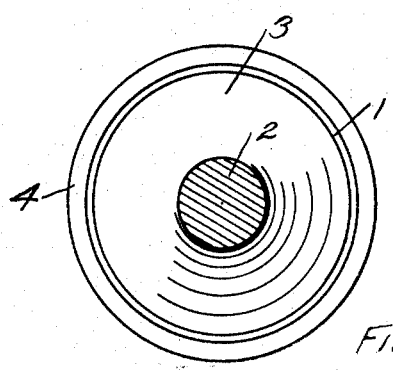

Fig. 3 an end view of the structure shown in Fig. 1.

1 marks the outer member which is in the form of a shell, 2 the inner member, and 3 the interposed rubber which is surface-bonded to the inner and outer members preferably by vulcanization putting the intervening rubber under tension. 4 shows a connecting tube which is designed to connect two of the joint members, the outer member being crowded into the tube 4 with a pressure fit and by reason of its large diameter carrying the driving strain from one member to the other. The inner members 2 may form any driving system, as for instance, the driving system of an automobile, the tube 4 corresponding to the propeller shaft. The rubber preferably is made of greater thickness axially at the inner member than at the outer member, the relation being preferably such that each annular section is of the same area.

It will be noted that the outer member is annular and rotates about its center, the torsional pull being delivered from the pin to the outer member through the rubber. It will also be noted that with the rubber under initial tension the driving action is resisted and the relation between the parts held within quite close limits. At the same time the rubber under tension yields readily to incipient vibrations and thus kills the communication of vibration through the connection, it being understood that the rubber is under tension when it is elongated from the length it would assume if released.

What I claim as new is:—

1. A driving connection comprising an annular outer member rotating about an included center within the annulus; a rotating inner member within the outer member and out of axial alinement therewith; and a rubber member between the outer and inner members secured to the inner member by surface bonding and secured to the outer member the span of the rubber between the outer and inner members being free to move axially in either direction.

2. A driving connection comprising an annular outer member rotating about an included center within the annulus; a rotating inner member within the outer member and out of axial alinement therewith; and a rubber member between the outer and inner members secured to the inner and outer members by surface bonding the span of the rubber between the outer and inner members being free to move axially in either direction.

3. A driving connection comprising an annular outer member rotating about an included center within the annulus; a rotating inner member within the outer member and out of axial alinement therewith; and a rubber member between the outer and inner members secured to the inner and outer members by surface bonding during vulcanization.

4. A driving connection comprising an annular outer member rotating about an included center within the annulus; a rotating inner member within the outer member and out of axial alinement therewith; and a rubber member between the outer and inner members secured to the inner member by surface bonding and secured to the outer member, said rubber member having a greater thickness axially adjacent to the inner member than at the outer member.

5. A driving connection comprising an annular outer member rotating about an included center within the annulus; a rotating inner member within the outer member; and a rubber member between the outer and inner members, said rubber member being under initial tension.

6. A driving connection comprising an annular outer member rotating about an included center within the annulus; a rotating inner member within the outer member; and a rubber member between the outer and inner members secured to the outer and inner members by surface bonding with the rubber under initial tension.

7. The combination, with a driving and a driven member, one of said members having a portion surrounding the adjacent portion of the other member, of means flexibly connecting said members, the said means comprising an annular body of deformable resilient material, said annular body having an inner surface vulcanized to the outer portion of the inner member and having its outer surface vulcanized to the inner surface of the outer portion of the other member, the said body being concaved between the inner and outer surfaces thereof.

8. A driving connection comprising an annular outer member rotating about an included center within the annulus, a rotating inner member within the outer member and capable of relative misalinement thereto; and a rubber member between the outer and inner members secured to the inner and outer members by surface bonding during vulcanization.

9. A driving connection comprising an annular outer metallic member; an inner metallic member, one of said members having a rotative driving movement about the axis and the other of said members being driven thereby; and an interposed annular rubber member between the outer and inner members.

In testimony whereof I have hereunto set my hand.

IRVING P. WHITEHOUSE.